United States Patent [19]
Delage

[11] 3,955,788
[45] May 11, 1976

[54] APPARATUS FOR POSITIONING AND SUPPORTING OPTICAL LABORATORY INSTRUMENTS

[76] Inventor: Jean Delage, 3, rue Paul Bert, 94400 Vitry-sur-Seine, France

[22] Filed: Jan. 24, 1975

[21] Appl. No.: 543,913

[30] Foreign Application Priority Data
Jan. 25, 1974 France .................................. 74.02482

[52] U.S. Cl. ............................ 248/228; 248/298; 248/466; 350/321; 356/256
[51] Int. Cl.² ............................................. E01B 7/18
[58] Field of Search ........ 24/263 R, 263 A, 263 LS; 35/19 B; 248/178, 221, 226, 228, 230, 295–298, 309, 310, 424, 429, 466, 469, 475 R, 476; 350/245–247, 250–252, 255–257, 321; 356/256

[56] References Cited
UNITED STATES PATENTS

| | | | |
|---|---|---|---|
| 1,232,565 | 7/1917 | Karn ................................ 248/228 X |
| 2,803,986 | 8/1957 | Choiniere et al. ............... 248/298 X |
| 3,184,208 | 5/1965 | Tanaka ............................... 248/429 |
| 3,275,276 | 9/1966 | Johnson ........................ 24/263 A X |
| 3,462,110 | 8/1969 | Cheslock ........................... 248/221 |
| 3,574,468 | 4/1971 | Herman .............................. 356/256 |
| 3,747,890 | 7/1973 | Tubbs ................................ 248/466 |
| 3,794,431 | 2/1974 | Rothrock ........................... 356/256 |

FOREIGN PATENTS OR APPLICATIONS

| | | | |
|---|---|---|---|
| 614,637 | 12/1948 | United Kingdom ................. 350/321 |
| 731,435 | 2/1943 | Germany ........................... 350/321 |
| 945,083 | 6/1956 | Germany ........................... 248/228 |
| 994,690 | 6/1965 | United Kingdom ................. 248/228 |
| 2,016,067 | 10/1971 | Germany ........................... 248/466 |

*Primary Examiner*—Roy D. Frazier
*Assistant Examiner*—Lawrence J. Staab

[57] ABSTRACT

The present invention relates to a device for positioning and supporting apparatus, particularly for optical instruments in a laboratory, constituted on the one hand by a support rail and on the other hand by a clamp mounted to slide on said rail, the rail being constituted by a linear circular-sectioned tubular structure, the tubular section having four diametrically opposite radial fins projecting therefrom, the clamp is adapted to be positioned on two adjacent fins, the clamp comprising two side branches, one of which receives an adjustable locking member abutting an outer face of a fin.

4 Claims, 4 Drawing Figures

APPARATUS FOR POSITIONING AND SUPPORTING OPTICAL LABORATORY INSTRUMENTS

The present invention relates to a device for supporting and accurately positioning apparatus, particularly apparatus intended for effecting measurements and tests.

One aim of the invention is to provide a device for positioning physical apparatus at precise levels or spots, particularly optical apparatus intended for studying or measuring the path of light rays, and disposed on optical benches.

A further aim of the invention is to provide a device for supporting instruments, particularly for optical apparatus in a laboratory, constituted on the one hand by a support rail and on the other hand by a clamp mounted to slide on said rail; the rail being constituted by a linear, circular-sectioned tubular structure, the tubular section having four diametrically opposite radial fins projecting therefrom, the tubular rail with radial fins cooperating with at least one U-sectioned clamp member that may be positioned on two adjacent fins, the clamp comprising on one side arm a screw that may abut on an outer face of a fin.

The four radial fins integral with the outer wall of the tubular rail are preferably disposed in two perpendicular planes, the axis of two adjacent fins thus forming an angle of 90°.

The use of a tubular rail therefore makes it possible for the rail to be used not only by its outer faces serving to support apparatus mounted on the locking clamps, but the inner space of the rail consituted by a cylindrical tube may also be used for the passage of optical rays or the like, whose beam is thus canalised by the inner walls of the tube; the inside space of the tube may thus be used for the passage of laser beams.

The radial fins integral with the wall of the cylindrical rail terminate in two faces intersecting at right angles and each positioned at 45° with respect to the radial axis of the fin.

Under these conditions, two adjacent fins comprise two faces disposed in the same plane; these two faces may thus constitute the support surface of the rail on a support base; these two faces may also constitute the support surface for a clamp supported by the rail.

The terminal edge of each fin constituted by the intersecting of the two faces in V-form at 90° is preferably slightly curviform; thus the forming of a sharp-angled edge at the end of each fin is avoided; such sharp angle would in the first place be a source of deformation, in that the thinness of the material at the angle may undergo deformation due to a shock, which might remove the inherent flatness of the faces of two adjacent fins; furthermore, the curviform edge presented by the end of each fin enables the clamps to slide on two adjacent fins by sliding of contact faces, as will be seen hereinafter, by avoiding contact between the end of the fins and the bottom of the receiving grooves constituted by the inside of the locking clamps.

Another important point of the invention concerns the locking clamps.

According to a feature of the invention, the tubular rails with four diagonally opposite fins, are associated with at least one clamp this latter being constituted by a plate whose outer face is flat and whose inner face coming into contact with the fins of the rail comprises a first side branch forming a first groove whose section is substantially complementary of the section of the fin engaged in said groove and, on the opposite side, comprises a second side branch serving as support face for a manoeuvrable locking member and bearing on the outer face disposed opposite a second fin adjacent the fin inserted in the first groove of the plate.

The locking member is preferably constituted by a U-piece astride the second side branch, the arm of the U coming in contact with a second fin, comprising to this end a bevelled face parallel to the plane of the outer side edge of the second fin, the opposite arm of the U-locking piece being associated with a manoeuvring screw, said screw being associated with a knurled knob and being mounted idly on the two arms of the U-locking member and passing through a threaded hole in the second side branch; the rotation of said screw, controlled by the knurled knob, thus provoking the forward or backward movement of the U-locking member with respect to the support bar.

Thus, by rotating the outer knob, either the inward advance of the support member is obtained, the bevelled face of this latter then bearing on the parallel face coming opposite the complementary fin; or the rotation of the knurled knob in the reverse direction causes said support face to withdraw and consequently the clamp plate to be unlocked with respect to the rail.

Under these conditions, the plate comprises two grooves spaced apart so as to correspond to the positioning of two adjacent fins of the support rail, the two grooves comprising two faces located in the same plane parallel to the outer surface of the plate, these two faces located in the same plane receiving the outer faces located in the same plane as two adjacent fins.

According to an important feature of the invention, these two faces, located in the same plane, of the two grooves of the clamp plate receive a self-lubricated coating.

For example, the self-lubricated coating is constituted by a layer of synthetic fluorinated resin.

For example this coating is constituted by a strip based on ethylene polytetrafluoride.

The invention will be more readily understood on reading the following description and with reference to the accompanying drawings, in which.

Figure 1:
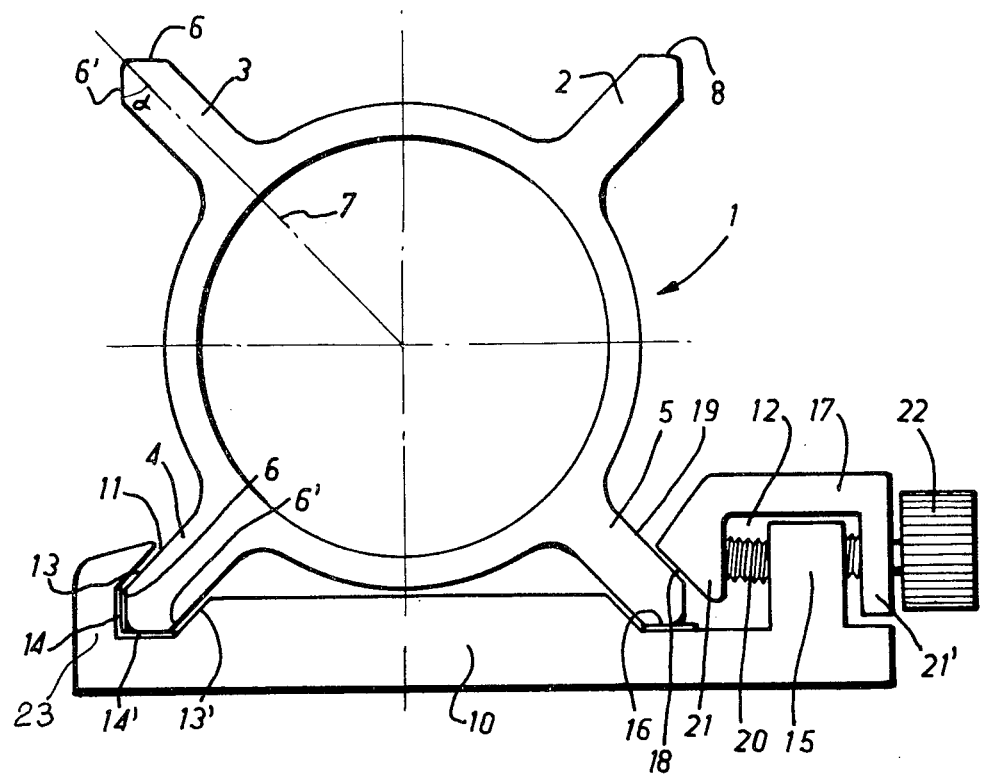
FIG. 1 shows a sectional view of the support rail mounted on a locking clamp.

Referring now to the drawings, all the Figures show that the rail 1 is constituted by a tube of circular cross section having four radial fins 2, 3, 4 and 5 projecting therefrom in the form of a cross and at right angles to one another.

Each fin terminates by two faces 6 and 6' at right-angles to each other, each face forming an angle $\alpha$ of 45° with the axis 7 corresponding to a radial axis and to the median axis of each fin. Under these conditions, two adjacent fins, e.g. fins 2 and 3, comprise two faces 6 and 8 constituting the inner end faces of the fins which are located in the same plane; these faces constitute the face for supporting the rail on a support plane or the face supporting the rail on locking clamps as well as the support face receiving the clamps supported by the rail, as shown in FIG. 2.

Figure 3:
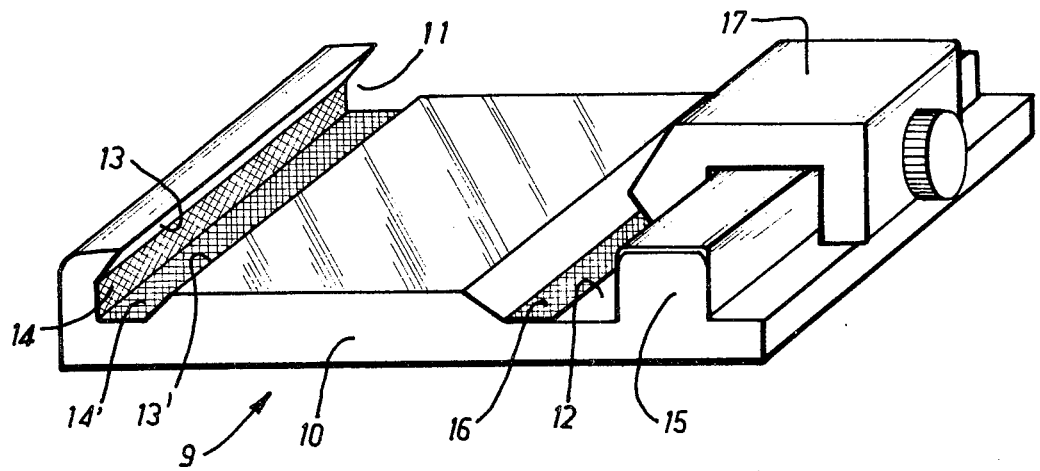
FIG. 3 shows a perspective view of a locking clamp by itself.

To this end, the rail cooperates with clamp plates, details of which are shown in perspective in FIG. 3.

Figure 2:
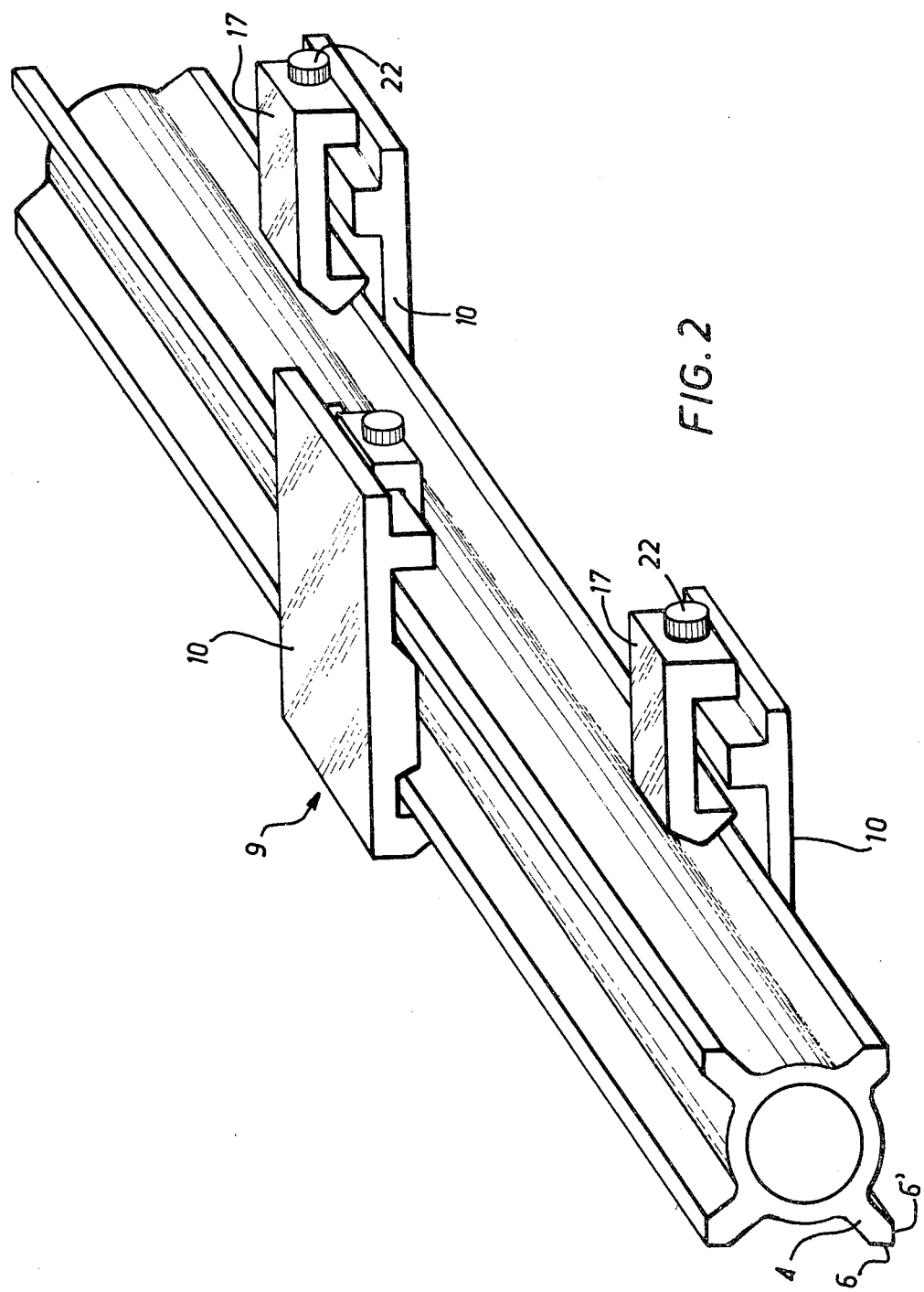
FIG. 2 shows a perspective view of a support rail associated with two lower clamps and one upper clamp, said clamps sliding on the rail.

The clamp 9 is composed of a plate 10 whose outer plane is flat (as may be seen for example for the clamp lying on the rail in FIG. 2); the upper plane thus offered by the clamp constitutes the support plane for an apparatus; this face of the plate 10 may be provided with threaded holes for positioning and locking apparatus supported thereby.

The plate comprises, on its opposite face turned towards the rail, two grooves, viz. a first groove 11 and a second groove 12; the section of the first groove 11 is formed by the plate 10 and the first side branch 23; it is substantially complementary of the fin 4 inserted therein; the two parallel faces 13 and 13' of the groove 11 are, however, spaced apart by a distance slightly greater than the thickness of the fin 4 so as to allow free clearance and free sliding of said fin in said groove 11.

In addition, this first groove comprises two faces 14 and 14' disposed at right angles and on which abut the two right-angled faces 6 and 6' of the fin 4; these two faces 14 and 14' constitute the contact and slide surfaces of the clamp on the fin 4; to this end, these two faces are provided with a self-lubrificating coating, for example a strip based on ethylene polytetrafluoride.

On the side opposite the groove 11 the clamp comprises a much wider groove 12 outwardly defined by the second side branch 15; the bottom 16 of the groove 12 located in the same plane as the bottom 14' of groove 11 is also provided with a self-lubricated coating; in fact, this face 16 constitutes the support and slide face of the clamp on the corresponding edge of the fin 5.

The locking is obtained by a locking member 17 constituted by a U-shaped device mounted astride the branch 15; on the side facing the rail, the U-member comprises a point having a face 18 parallel to the side face 19 of the fin 5; an adjusting screw 20 is mounted idly in the two arms 21, 21' of the U-member 17 and passes through a threaded hole provided in the branch 15. The screw may be manoeuvred from the outside by the knurled knob 22; by rotating this latter, the U-member 17 is therefore moved sideways and its support face 18 bears on the face 19 of the fin 5 and ensures that the clamp-rail assembly is locked.

Figure 4:
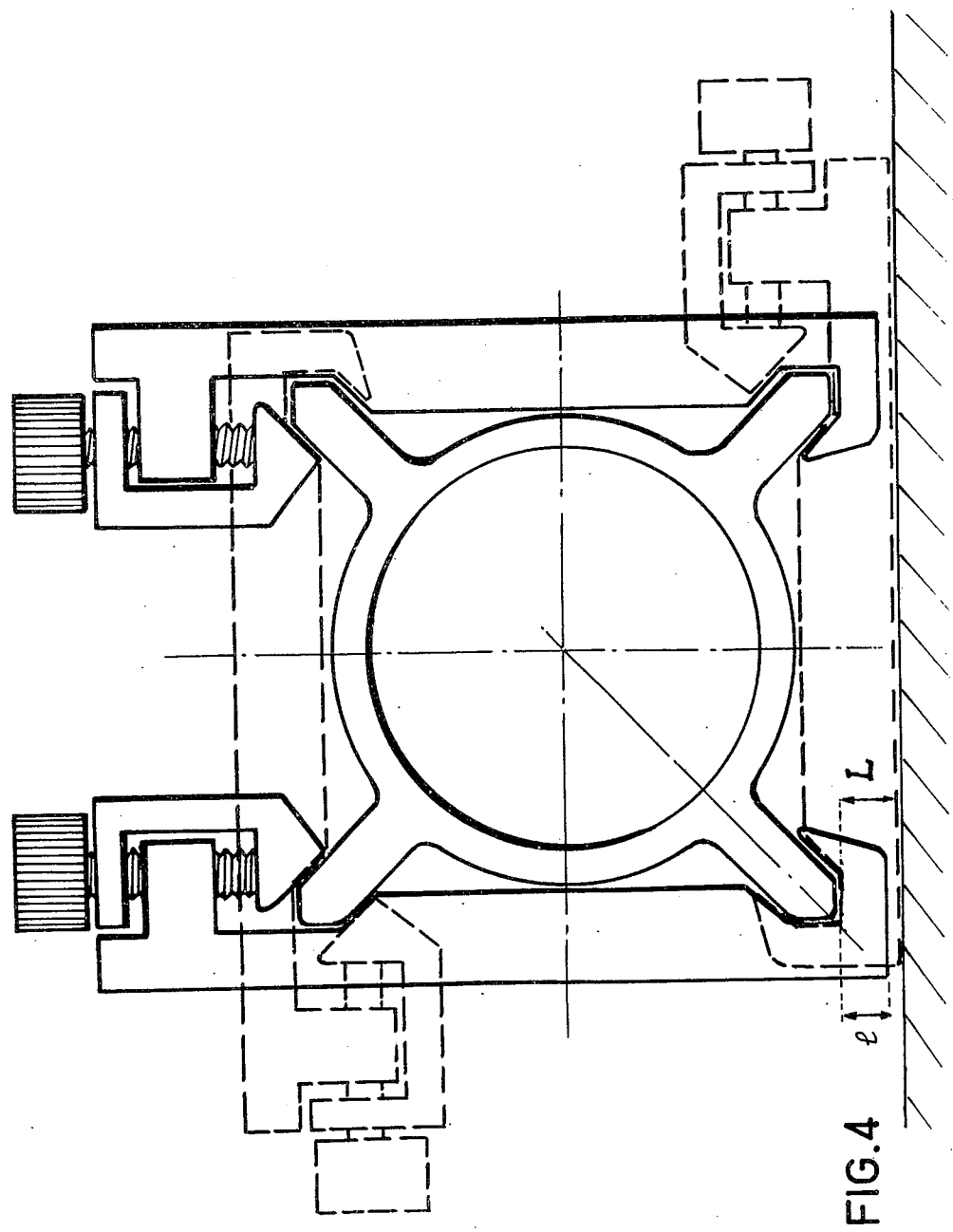
FIG. 4 shows a sectional view, of a support rail with horizontal and vertical clamps mounted thereon.

In addition, it will be specified that the thickness L of the clamp 10 is greater than the thickness 1 of the first side branch 23; this feature will in particular enable the rail to be positioned on two support clamps whilst enabling a side clamp to be placed vertically on the two side fins (see FIG. 4).

What is claimed is:

1. A device for supporting and positioning relatively movable instruments such as optical apparatus used in laboratories, said device comprising:
    a rail constituted by a linear tubular structure and comprising at least three radial fins projecting from said tubular structure, the ends of said fins being equidistant from one another;
    a plurality of clamps, each clamp being constituted by a plate comprising a flat outer face adapted to fixedly receive said instruments, and an inner face slidably mounted on any two adjacent fins of said rail, the inner face of each clamp comprising a first side branch forming a groove whose section is substantially complementary to the section of a fin and receiving one of the two adjacent fins and, on the opposite side, a second side branch supporting a locking member having a surface adapted to abut in locking position the second fin, said groove and said locking member being situated at a distance from each other corresponding to the distance separating any two adjacent fins, thus permitting any clamp slidably to be mounted on any two of the radial fins.

2. A device according to claim 1, wherein said rail is constituted by a circular sectioned tubular structure comprising four radial fins integral with the wall of the tubular structure and disposed in two perpendicular planes, the ends in section of the fins corresponding to the angles of a theoretical square, and said ends terminating in two faces situated along the dihedral of a theoretical parallelepiped of square section, any two adjacent fins thus forming a support for a clamp resting on the two faces situated in a same plane and belonging to said two adjacent fins, the rail being so adapted to receive clamps on four sides.

3. A support device according to claim 1, wherein said locking member is constituted by a U-shaped member astride the second side branch, one arm of the U-shaped member which comes in contact with the second fin comprising a bevelled face parallel to the plane of the outer side edge of the fin terminated by a knurled knob and being mounted idly on said two arms of the U-shaped locking member and passing through a threaded hole in said second side branch, the rotation of said screw, controlled by the knurled knob, thus controlling the forward or backward movement of the member with respect to the supporting second side branch.

4. A support device according to claim 3, wherein the thickness of the first side branch of the clamp is less than the thickness of the clamp plate, thus allowing the rail to be placed on clamps resting on a plane and used as support for said rail whereas the two lower fins of the rail are spaced from said plane by a distance sufficient to permit said fins to be engaged in the first groove of lateral clamps vertically disposed on two lateral fins of the rail.

* * * * *